US012752410B2

(12) United States Patent
Yang

(10) Patent No.: US 12,752,410 B2
(45) Date of Patent: Oct. 6, 2026

(54) SPRING-LOADED NAIL GUN

(71) Applicant: ZHEJIANG PRULDE ELECTRIC APPLIANCE CO., LTD., Jinhua (CN)

(72) Inventor: Chenghao Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 0 days.

(21) Appl. No.: 19/381,915

(22) Filed: Nov. 6, 2025

(65) Prior Publication Data

US 2026/0124727 A1 May 7, 2026

(30) Foreign Application Priority Data

Nov. 7, 2024 (CN) ......................... 202422717618.1

(51) Int. Cl.
*B25C 1/06* (2006.01)
*B25C 1/00* (2006.01)

(52) U.S. Cl.
CPC ................ *B25C 1/06* (2013.01); *B25C 1/008* (2013.01)

(58) Field of Classification Search
CPC .. B25C 1/06; B25C 1/04; B25C 1/063; B25C 1/066; B25C 1/068; B25C 1/008; F16F 1/06; F16F 1/12
See application file for complete search history.

(56) References Cited

U.S. PATENT DOCUMENTS 3,061,833 A * 11/1962 De Caro ................. B25C 1/143
227/10
3,978,576 A * 9/1976 Mustoe, Jr. ............. B25C 11/02
254/18
4,565,313 A * 1/1986 Buck ......................... B25C 1/06
173/117
5,482,261 A * 1/1996 Ortega ...................... F16F 3/06
267/168
7,992,756 B2 * 8/2011 Franz ........................ B25C 5/15
227/132
10,989,241 B2 * 4/2021 Kargenian ................ B25C 5/15
(Continued)

FOREIGN PATENT DOCUMENTS

WO 2016/031716 A1 3/2016
WO 2022/159538 A1 7/2022

OTHER PUBLICATIONS

Mar. 10, 2026 Extended Search Report issued in European Patent Application No. 25 213 476.2.

*Primary Examiner* — Dariush Seif
(74) *Attorney, Agent, or Firm* — Oliff PLC

(57) ABSTRACT

A spring-loaded nail gun, including a guide rod, striking spring, striking unit, and drive unit, the striking unit including a striking block and striker, the drive unit including an electric motor and lifting member; a sleeve is provided on the guide rod; a slot fitted with the sleeve is provided on the striking block; the sleeve has limiting and base portions which are axially distributed, outer diameter of the limiting portion being smaller than that of the base; an end portion of the striking spring is sleeved on the limiting portion and abuts the base; the sleeve is pressed by the striking spring into the slot, including the end portion, which is radially bidirectionally limited by the limiting portion and the circumferential inner wall of the slot, which enhances structural stability of the end portion of the striking spring and prevents deformation over prolonged operation.

11 Claims, 8 Drawing Sheets

(56) References Cited

U.S. PATENT DOCUMENTS

| | | | | |
|---|---|---|---|---|
| 11,618,144 | B2 * | 4/2023 | Yang | B25C 1/001 227/129 |
| 11,877,937 | B2 * | 1/2024 | Greenspan | G01B 7/18 |
| 12,257,681 | B2 * | 3/2025 | Yang | B25C 1/047 |
| 12,485,520 | B2 * | 12/2025 | Ying | B25C 1/00 |
| 2007/0284406 | A1 * | 12/2007 | Okouchi | B25C 1/06 227/132 |
| 2008/0210736 | A1 * | 9/2008 | Blessing | B25C 1/06 227/132 |
| 2015/0247559 | A1 * | 9/2015 | Graves | F16F 15/067 474/117 |
| 2016/0201353 | A1 * | 7/2016 | Niekamp | E04H 17/263 173/124 |
| 2017/0297187 | A1 * | 10/2017 | Nishikawa | B25C 1/06 |
| 2019/0152034 | A1 * | 5/2019 | Kargenian | B25C 1/06 |
| 2019/0248442 | A1 * | 8/2019 | Winefordner | B62K 25/10 |
| 2019/0381644 | A1 * | 12/2019 | Vandenberg | B25C 1/003 |
| 2021/0060748 | A1 * | 3/2021 | Yang | B25C 1/001 |
| 2021/0060749 | A1 * | 3/2021 | Yang | B25C 1/001 |
| 2022/0193873 | A1 * | 6/2022 | Li | B25C 1/008 |
| 2022/0226977 | A1 * | 7/2022 | Nettleton | B25C 1/001 |
| 2022/0355456 | A1 * | 11/2022 | Ohno | B25C 1/06 |
| 2023/0021341 | A1 * | 1/2023 | Miyashita | B25C 1/008 |
| 2023/0234200 | A1 * | 7/2023 | Wang | B25C 1/06 227/130 |
| 2023/0405781 | A1 * | 12/2023 | Huang | B25C 1/047 |
| 2024/0091920 | A1 * | 3/2024 | Yang | B25C 1/06 |
| 2024/0139924 | A1 * | 5/2024 | Liu | B25C 1/06 |
| 2024/0300080 | A1 * | 9/2024 | Ying | B25C 5/10 |
| 2024/0326209 | A1 * | 10/2024 | Ying | B25C 1/06 |
| 2024/0335930 | A1 * | 10/2024 | Liang | B25C 1/06 |
| 2025/0162118 | A1 * | 5/2025 | Ootsuka | B25C 1/06 |
| 2025/0222578 | A1 * | 7/2025 | Yang | B25C 1/047 |
| 2026/0124727 | A1 * | 5/2026 | Yang | B25C 1/06 |

* cited by examiner

SPRING-LOADED NAIL GUN

FIELD

The present application relates to a power tool, and more particularly relates to a spring-loaded nail gun.

BACKGROUND

Nail guns are common nail driving tools. An existing spring-loaded nail gun generally includes a guide rod, a spring, a striking block, a striker, and a power structure, the spring being sleeved over the guide rod, one end of the spring being positionally fixed and an opposite end thereof abutting against the striking block, the striking block being slidably sleeved on the guide rod, the striker being attached to the striking block, the power structure driving the striking block and the striker to move towards the compressed spring so that the spring is compressed to store energy. When the striking block is released, the spring is relaxed, and the compressed spring drives the striking block and the striker to move rapidly along the guide rod towards a nail, while the rapidly moving striker drives the nail into a workpiece. In the existing spring-loaded nail gun, one end of the spring directly abuts against the striking block. As the inner diameter of the spring is greater than the outer diameter of the guide rod, the spring is prone to radial displacement, likely causing deformation of the spring over prolonged operation; this may undermine structural stability and performance reliability of the spring and thus cannot guarantee the effect of nail driving.

SUMMARY

To overcome the above drawbacks and disadvantages in conventional technologies, the present disclosure provides a spring-loaded nail gun, which enhances structural stability of an end portion of a striking spring by bidirectionally and axially limiting the end portion of the striking spring via a limiting portion and a circumferential inner wall of a slot, thereby preventing the end portion of the striking spring from being deformed over prolonged operation.

A spring-loaded nail gun according to the present disclosure comprises:

- a guide rod;
- a striking spring sleeved over the guide rod with a gap therebetween;
- a striking unit comprising a striking block slidably sleeved on the guide rod and a striker attached to the striking block, the striking spring, when being compressed, driving the striking unit to move along a preset nailing direction to drive a fastener into a workpiece; and
- a drive unit comprising an electric motor and a lifting member actuated by the electric motor, the lifting member being actuated by the electric motor to drive the striking unit to move along a preset energy-storing direction such that the striking spring is compressed, the energy-storing direction being opposite the nailing direction;
- wherein a sleeve is further sleeved on the guide rod, and a slot adapted to fit with the sleeve is formed on the striking block, the sleeve has a limiting portion and a base portion which are axially distributed, an outer diameter D1 of the limiting portion being smaller than an outer diameter D2 of the base portion, an end portion of the striking spring being sleeved on an outer periphery of the limiting portion and abutting against the base portion, the sleeve being pressed by the striking spring into the slot, the end portion of the striking spring being also disposed in the slot.

In some implementations, the limiting portion has an axial height H ranging from 7 mm to 15 mm.

In some implementations, the slot has an inner diameter D3, and the striking spring has an inner diameter d1 and an outer diameter d2, where D1□d1□d2≤D2≤D3.

In some implementations, an elastic pad is provided on the base portion, the end portion of the striking spring abutting against the elastic pad.

In some implementations, the striking spring is configured to include a small-diameter spring and a large-diameter spring which are nested one inside the other with a gap therebetween; the limiting portion includes a first limiting portion corresponding to the small-diameter spring and a second limiting portion corresponding to the large-diameter spring; the first limiting portion is thinner than the second limiting portion so that a stepped surface is formed therebetween; an end portion of the small-diameter spring is sleeved on an outer periphery of the first limiting portion and abuts against the stepped surface, and an end portion of the large-diameter spring is sleeved on an outer periphery of the second limiting portion and abuts against the base portion.

In some implementations, the elastic pad is provided on the stepped surface and the base portion, respectively.

In some implementations, the elastic pad has a thickness T ranging from 1 mm to 4 mm.

In some implementations, at least one notch is provided in a circumferential direction of the slot.

In some implementations, the lifting member comprises a lifting wheel and a drive pin arranged on the lifting wheel; a transmission surface adapted to fit with the drive pin is provided on the striking block; the lifting wheel, when rotating, drives, via abutment between the drive pin and the transmission surface, the striking unit to move along the preset energy-storing direction; and a minimum distance L between the transmission surface and a central axis of the guide rod is greater than a radius of the striking spring.

In some implementations, the striking block is provided with a thickened portion protruding toward the lifting wheel, and the transmission surface is arranged on the thickened portion.

With the technical solution noted supra, the present disclosure offers the following benefits:

1. The spring-loaded nail gun according to the present disclosure enhances structural stability of the end portion of the striking spring by adding a sleeve with a limiting portion and a base portion to the guide rod, forming the slot on the striking block, and sleeving the end portion of the striking spring on an outer periphery of the limiting portion to abut against the base portion, where the sleeve is pressed by the striking spring into the slot and the end portion of the striking spring is also disposed in the slot so that the end portion of the striking spring is radially bidirectionally limited via the limiting portion and the circumferential inner wall of the slot; this prevents the end portion of the striking spring from deformation over prolonged operation and ensures performance reliability of the striking spring; consequently, it is ensured that the compressed striking spring, when being relaxed, acts stably on the striking unit, which further ensures the nailing performance.
2. A reasonable axial height H of the limiting portion satisfies the requirements on radial limitation of the striking spring while controlling the weight of the sleeve to a reasonable extent. If the axial height H of the limiting portion were set to be less than 7 mm, the striking spring would have an insufficient length for receiving the radial limitation, so that the limiting portion could not satisfy the requirement on radially limiting the striking spring. If the axial height H of the limiting portion were greater than 15 mm, the sleeve would have an excessive weight significantly increasing the weight of the striking unit, a consequence of which is that the striking unit driven by the compressed striking spring would be slowed down in moving along the nailing direction, so that the nailing performance cannot be guaranteed.

3. By setting the radial size relationship between the sleeve, the striking spring, and the slot to D1□d1□d2≤D2≤D3, the end portion of the striking spring, irrespective of in the compressed state or in the relaxed state, can be stably disposed between the outer circumferential surface of the limiting portion and the inner wall of the slot.
4. The elastic pad provided on the base portion and abutting against the end portion of the striking spring enables formation of a circle of effective contact in the circumferential direction between the striking spring and the base portion; this enhances contact stability between the striking spring and the sleeve and thus enhances movement stability of the striking unit along the nailing direction when the striking unit is subjected to the force exerted by the compressed striking spring, further enhancing the nailing performance.
5. By arranging two striking springs nested one inside the other with a gap therebetween, the force of the compressed striking spring acting on the striking unit upon nailing is increased, which increases the movement speed of the striking unit and enhances nailing performance. In this case, the sleeve is provided with a first limiting portion and a second limiting portion, where the end portion of the small-diameter spring is sleeved on an outer periphery of the first limiting portion and abuts against the stepped surface, while the end portion of the large-diameter spring is sleeved on an outer periphery of the second limiting portion and abuts against the base portion. By setting a reasonable structure of the sleeve based on the structure of the striking spring, the end portion of the small-diameter spring and the end portion of the large-diameter spring can both be radially limited.
6. By arranging at least one notch in the circumferential direction of the slot, the slot is formed with a circumferential opening structure, which can reduce the thickness of the striking block to an appropriate extent and thus reduce the weight of the striking block appropriately; this further increases the moving speed of the striking unit driven by the compressed striking spring along the nailing direction, thereby enhancing the nailing performance.
7. The lifting member comprises a lifting wheel and a drive pin, a transmission surface adapted to fit with the drive pin is arranged on the striking block, the lifting wheel is actuated by the electric motor to rotate, and the drive pin abuts against the transmission surface on the striking block when the lifting wheel rotates; the interaction between the drive pin and the transmission surface drives the striking unit to move along the energy-storing direction, during which process the striking spring is compressed. By reasonably setting the specific structure of the lifting wheel, the electric motor can actuate, via the lifting wheel, the striking unit and the striking spring to move to the energy-storing state. The minimum distance L between the transmission surface and the central axis of the guide rod is set to be greater than the radius of the striking spring; this reasonable distance relationship between the transmission surface and the guide rod prevents the drive pin moving with the lifting wheel from colliding with the striking spring, thereby ensuring structural stability of the striking spring.
8. The striking block is provided with a thickened portion and the transmission surface is arranged on the thickened portion. By setting a reasonable structure of the striking block, the size of the striking block is controlled while enough distance can be provided between the transmission surface and the striking spring, which prevents the drive pin on the lifting wheel, when rotating with the lifting wheel, from colliding with the striking spring.

Figure 1:
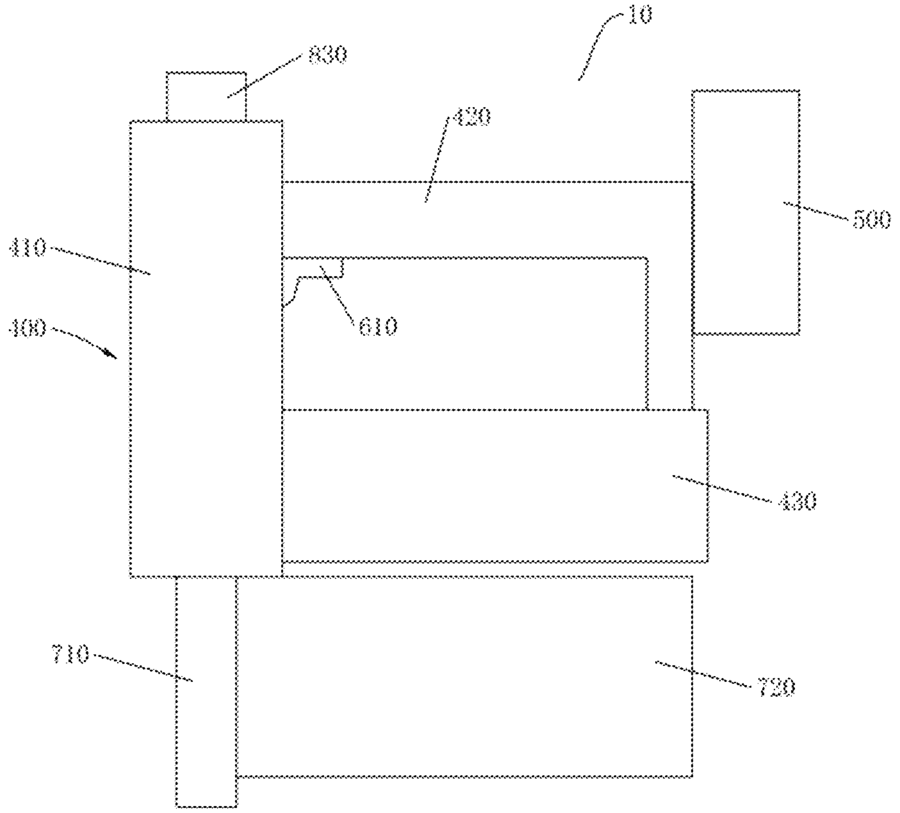
FIG. 1 is an overall schematic diagram of a spring-loaded nail gun according to a first implementation.

In the drawings: 10—spring-loaded nail gun;

110—guide rod; 120—striking spring; 121—small-diameter spring; 122—large-diameter spring

200—striking unit; 210—striking block; 211—slot; 212—shaft bore; 213—notch; 214—transmission surface; 215—clearance recess; 216—thickened portion; 220—striker; 230—sleeve; 231—limiting portion; 231*a*—first limiting portion; 231*b*—second limiting portion; 232—base portion; 233—stepped surface; 240—elastic pad;

300—drive unit; 310—electric motor; 320—lifting member; 321—lifting wheel; 322—drive pin; 323—pin; 330—speed reduction structure; 331—output shaft;

400—housing; 410—body portion; 420—handle portion; 430—receiving portion;
500—battery pack;
610—trigger; 620—start/stop switch; 630—swing lever;
710—guide unit; 711—guide seat; 712—guide cover; 713—guide port; 714—strike passage; 715—front cover; 716—limiting passage;
720—nail feeding unit;
730—safety trigger unit; 730—safety switch; 732—ejecting rod; 733—ejecting pin; 734—locating element;
800—adjusting unit; 810—inner sleeve body; 811—protrusion; 812—locating plate; 813—rachet surface; 820—outer sleeve body; 821—convex rib; 830—screw cap; 840—adjusting spring.

DETAILED DESCRIPTION OF EMBODIMENTS

Hereinafter, the present disclosure will be further described through specific embodiments with reference to the drawings. It is appreciated that the orientational or positional relationships indicated by the terms "upper," "lower," "left," "right," "longitudinal," "transverse," "inner," "outer," "vertical," "horizontal," "top," and "bottom" are orientational and positional relationships based on the drawings, which are intended only for facilitating description of the disclosure and simplifying relevant illustrations, not for indicating or implying that the devices or elements compulsorily possess those specific orientations and are compulsorily configured and operated with those specific orientations; therefore, such terms should not be construed as limitations to this disclosure.

Embodiment 1

Referring to FIGS. 1 to 13, a spring-loaded nail gun 10 provided according to the first implementation comprises:

a guide rod 110;

a striking spring 120 sleeved over the guide rod 110 with a gap therebetween;

a striking unit 200 comprising a striking block 210 slidably sleeved on the guide rod 110 and a striker 220 attached to the striking block 210, the striking spring 120, when being compressed, driving the striking unit 200 to move along a preset nailing direction (M1) to drive a fastener into a workpiece;

a drive unit 300 comprising an electric motor 310 and a lifting member 320 actuated by the electric motor 310, the lifting member 320 being actuated by the electric motor 310 to drive the striking unit 200 to move along a preset energy-storing direction (M2) such that the striking spring 120 is compressed, the energy-storing direction (M2) being opposite the nailing direction (M1);

a sleeve 230 is further sleeved on the guide rod 110, and a slot 211 adapted to fit with the sleeve 230 is formed on the striking block 210, the sleeve 230 has a limiting portion 231 and a base portion 232 which are axially distributed, an outer diameter D1 of the limiting portion 231 being smaller than an outer diameter D2 of the base portion 232, an end portion of the sleeve 230 being sleeved on an outer periphery of the limiting portion 231 and abutting against the base portion 232, the sleeve 230 being pressed by the striking spring 120 into the slot 211, an end portion of the striking spring 120 being also disposed in the slot 211.

The end portion of the striking spring 120 is subjected to a bi-directional radial limitation by the limiting portion 231 and a circumferential inner wall of the slot 211; this enhances structural stability of the end portion of the striking spring 120, prevents the end portion of the striking spring 120 from deforming over prolonged operation, and ensures performance reliability of the striking spring 120. This guarantees that the compressed striking spring 120 upon relaxation acts stably on the striking unit 200, further ensuring nailing performance.

Referring to FIG. 1, in this embodiment, the spring-loaded nail gun 10 is provided with a housing 400. The housing 400 comprises a body portion 410, a handle portion 420, and a receiving portion 430, the body portion 410 extending substantially in a vertical direction, the handle portion 420 and the receiving portion 430 both extending substantially in an anteroposterior direction, a front end of the handle portion 420 and a front end of the receiving portion 430 being both attached to the body portion 410. The guide rod 110, the striking spring 120, and the striking unit 200 are disposed in the body portion 410, the handle portion 420 being configured for an operator to grip, the drive unit 300 being disposed in the receiving portion 430. As a feasible solution of this embodiment, the spring-loaded nail gun 10 can be powered by a battery pack 500 that is detachably mounted at a rear end of the handle portion 420. Of course, the spring-loaded nail gun 10 can also be powered by mains electricity.

Figure 2:
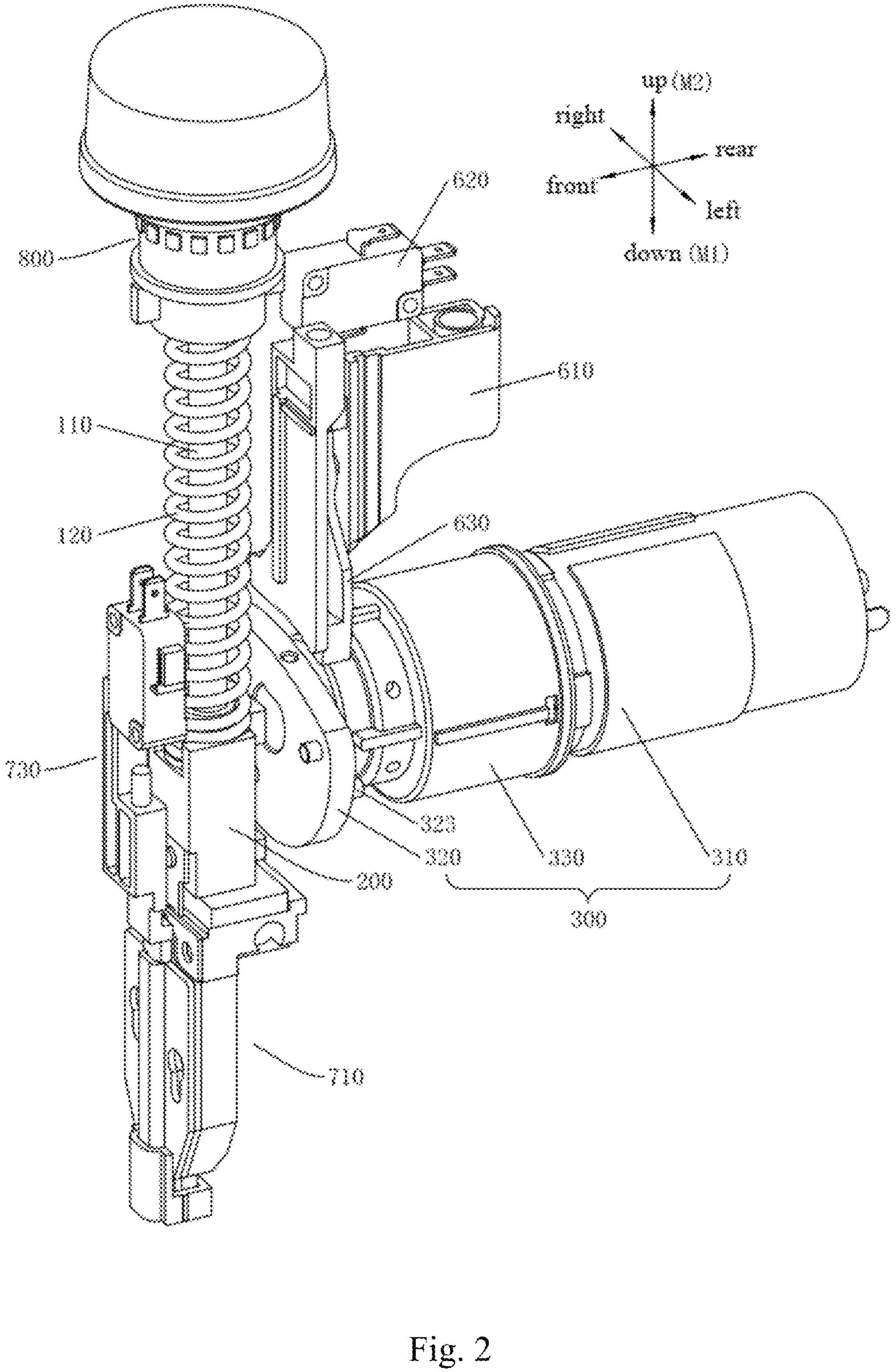
FIG. 2 is a partial structural view of the spring-loaded nail gun according to the first implementation.
Figure 3:
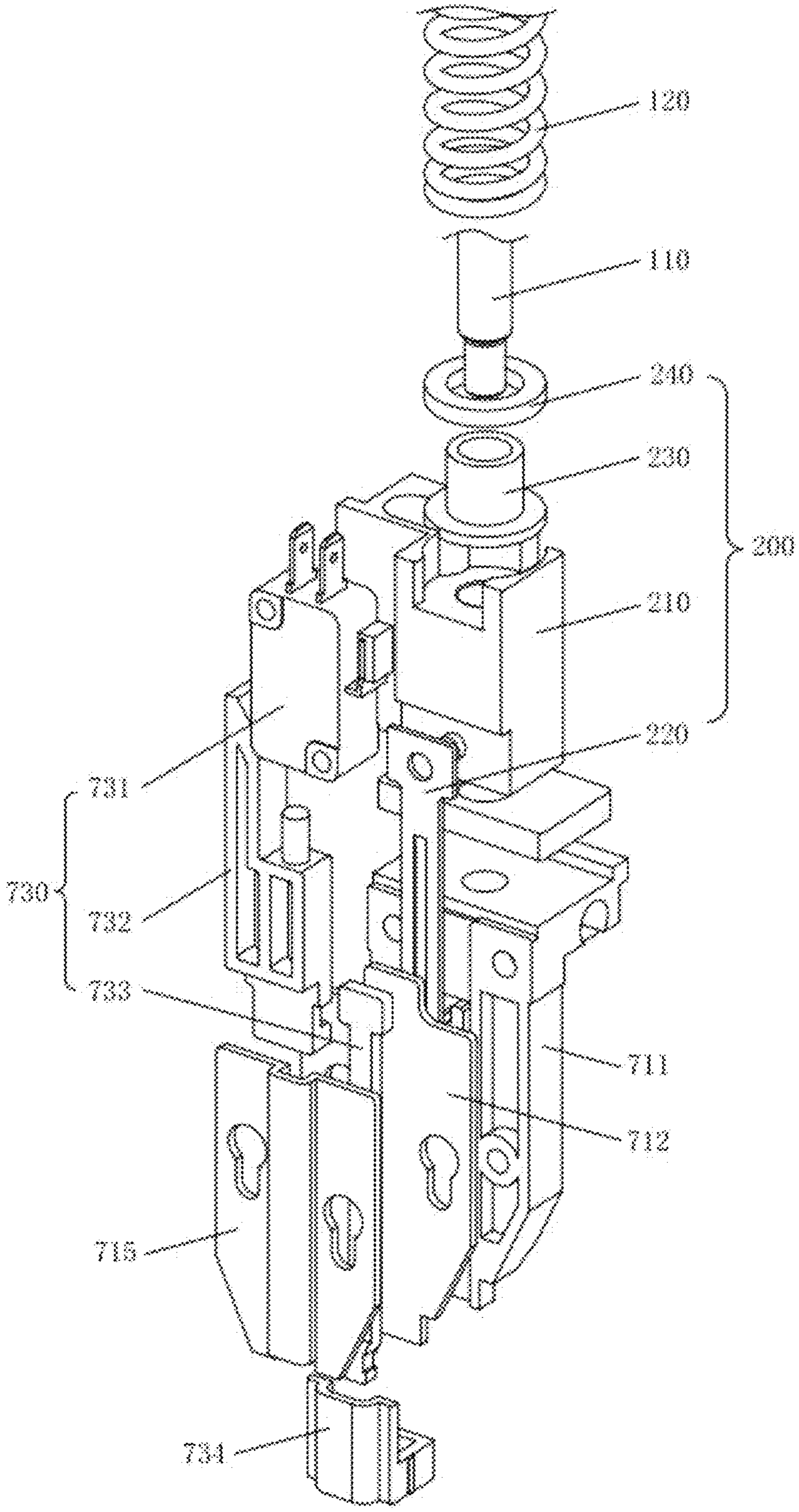
FIG. 3 is a partial structural exploded view of the spring-loaded nail gun according to the first implementation.
Figure 4:
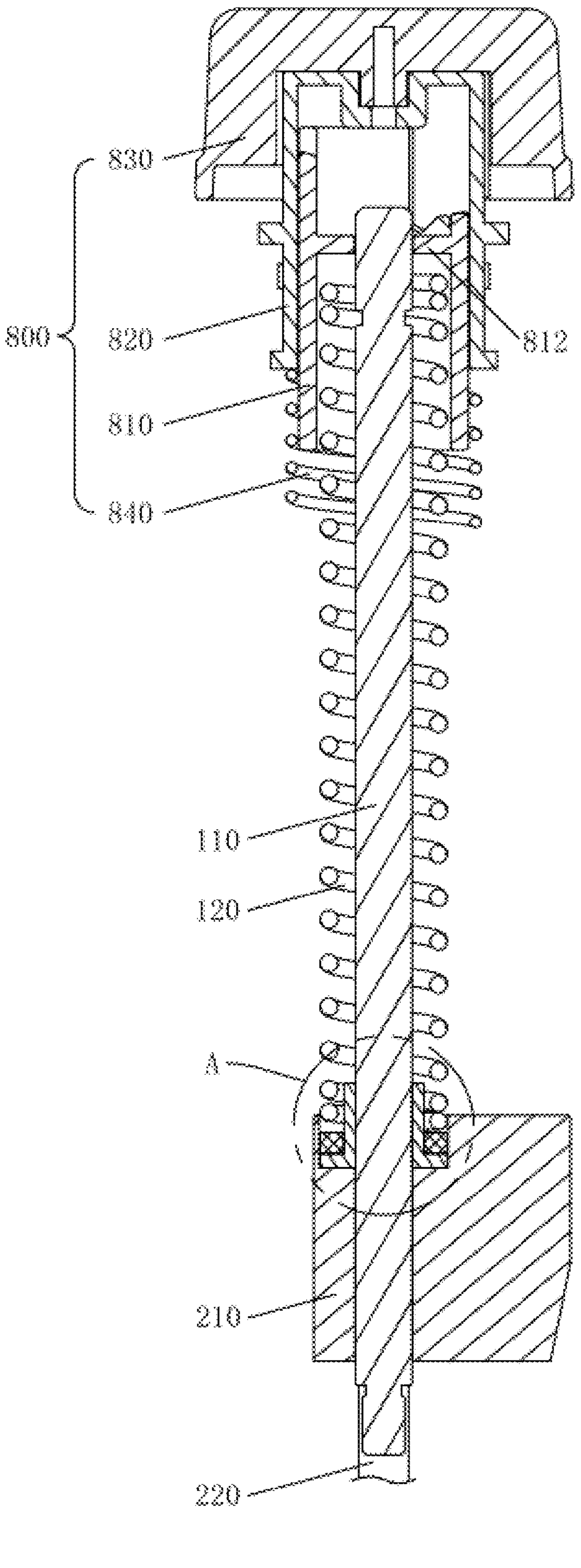
FIG. 4 is an axially sectional view of a partial structure of the spring-loaded nail gun according to the first implementation.

Referring to FIGS. 2 and 3, in this embodiment, one guide rod 110 and one striking spring 120 are provided, respectively. The guide rod 110 can be axially positioned in the body portion 410. The inner diameter of the striking spring 120 is greater than the outer diameter of the guide rod 110 such that the striking spring 120 can be sleeved over the guide rod 110 with a gap therebetween. A top end of the striking spring 120 is positionally fixed, and the axial directions of the guide rod 110 and the striking spring 120 are both arranged vertically. As a feasible solution of this embodiment, a difference between diameters of the guide rod 110 and the striking spring 120 can be set to a reasonable value such as 4 mm, 5 mm, 6 mm, 7 mm, or 8 mm.

Figure 5:
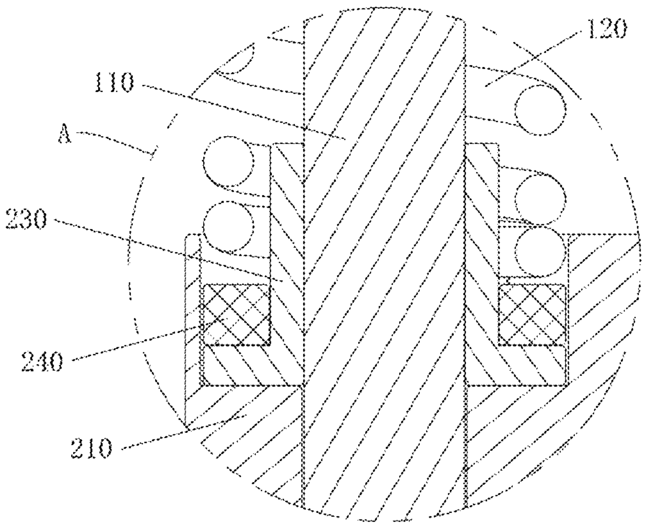
FIG. 5 is an enlarged view of part A in FIG. 4.
Figure 6:
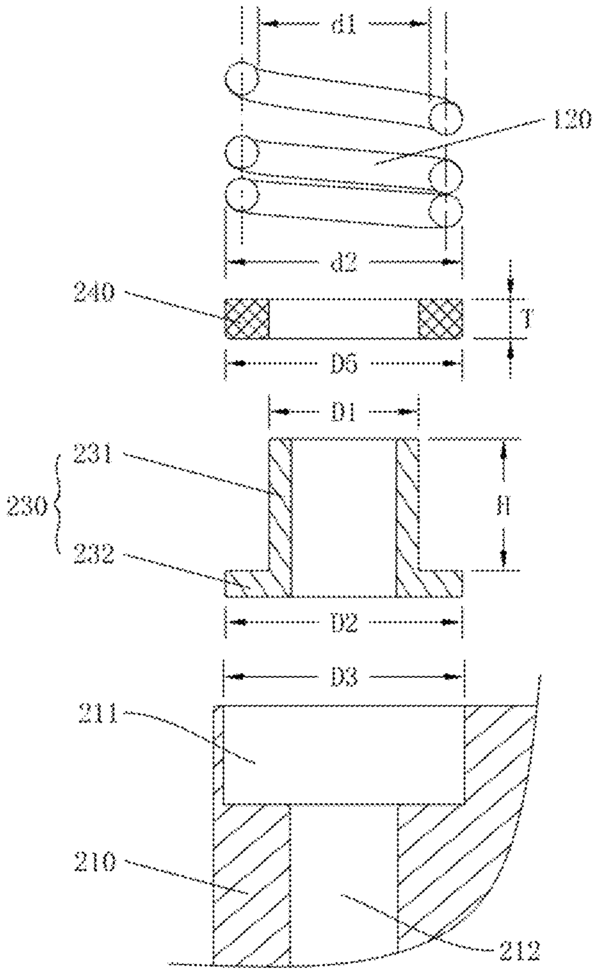
FIG. 6 is an exploded view of concerned members in FIG. 5.
Figure 7:
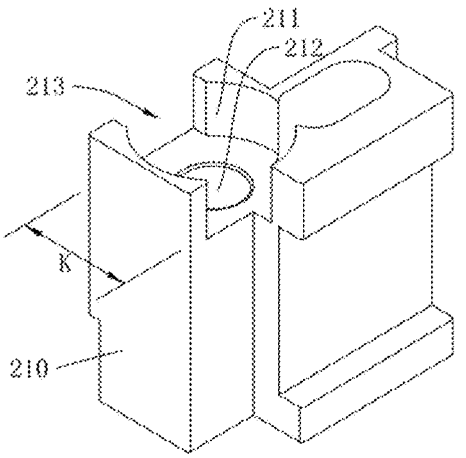
FIG. 7 is a first structural view of a striking block in the spring-loaded nail gun according to the first implementation.
Figure 8:
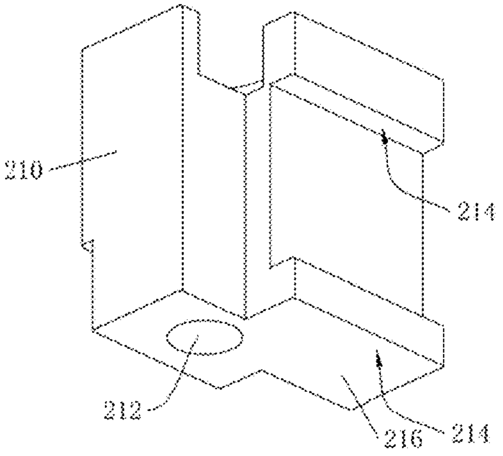
FIG. 8 is a second structural view of the striking block in the spring-loaded nail gun according to the first implementation.
Figure 9:
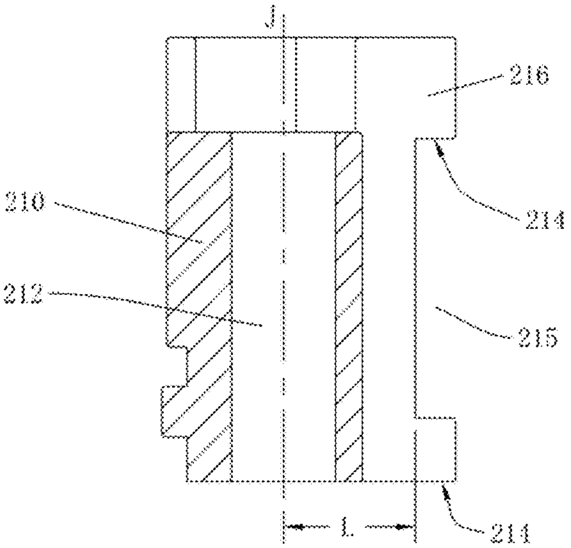
FIG. 9 is a sectional view of the striking block in the spring-loaded nail gun according to the first implementation.

Referring to FIGS. 7, 8, and 9, the striking block 210 is provided with a shaft bore 212 adapted to fit with the guide rod 110; the slot 211 is formed on a top side of the striking block 210 and communicates with the shaft bore 212; due to fit between the shaft bore 212 and the guide rod 110, the striking block 210 is sleeved on the guide rod 110 in an up-down slidable manner and disposed at a bottom portion of the striking spring 120. The sleeve 230 is configured to be increasingly thicker from top to bottom, where the upper portion of the sleeve 230 serves as the limiting portion 231 while the lower portion serves as the base portion 232. Referring to FIGS. 5 and 6, the inner diameter of the slot 211 is D3, the inner diameter of the striking spring 120 is d1, and the outer diameter of the striking spring 120 is d2, where $D1<d1<d2\leq D2\leq D3$. By reasonably setting the relationship between the radial sizes of the sleeve 230, the striking spring 120, and the slot 211, the end portion of the striking spring 120, irrespective of in a compressed state and a relaxed state, can always be disposed stably between the outer circumferential surface of the limiting portion 231 and the inner wall of the slot 211. Specifically, d1—D1 can be set to a reasonable value such as 1 mm, 1.2 mm, 1.5 mm, 1.8 mm, 2 mm, 2.2 mm, 2.5 mm, 2.8 mm, or 3 mm; D2—d2 can be set to a reasonable value such as 0, 0.1 mm, 0.3 mm, 0.5 mm, 0.7 mm, or 1 mm; and D3—D2 can be set to a reasonable value such as 0, 0.1 mm, 0.3 mm, 0.5 mm, 0.7 mm, or 1 mm.

To ensure the limiting effect of the sleeve 230 on the striking spring 120, the limiting portion 231 needs to be configured with a reasonable axial height H so as to meet the requirements on radial limitation of the striking spring 120 and appropriate weight control of the sleeve 230. In this embodiment, the axial height H of the limiting portion 231 ranges from 7 mm to 15 mm. Specifically, the axial height H of the limiting portion 231 is exemplarily set to 10 mm. Additionally, in this embodiment, a top surface of the striking block 210 can be set to be flush with or lower than a top surface of the sleeve 230. As an alternative solution of this embodiment, the axial height H of the limiting portion 231 can also be set to another reasonable value such as 7 mm, 8 mm, 9 mm, 11 mm, 12 mm, 13 mm, 14 mm, or 15 mm. As a feasible solution of this embodiment, the sleeve 230 can be made of a metal material such as stainless steel.

In this embodiment, an elastic pad 240 is provided on the base portion 232, the elastic pad 240 being sleeved on an outer periphery of the limiting portion 231, the end portion of the striking spring 120 abutting against the elastic pad 240 to press the elastic pad 240 against the base portion 232. The elastic pad 240 allows for the striking spring 120 and the base portion 232 to form a circle of effective contact in the circumferential direction, which enhances contact stability between the striking spring 120 and the sleeve 230 and further enhances movement stability of the striking unit 200 along the nailing direction (M1) when being subjected to the force from the compressed striking spring 120, thereby enhancing the nailing performance. In this embodiment, outer diameter D5 of the elastic pad 240 is substantially consistent with the outer diameter D2 of the base portion 232, and thickness T of the elastic pad 240 ranges from 1 mm to 4 mm. Moreover, the top surface of the striking block 210 is set higher than a top surface of the elastic pad 240, allowing for a lower end portion of the striking spring 120 to be inserted into the slot 211. As a feasible solution of this embodiment, the elastic pad 240 can be made of an elastic material such as silicone or rubber. As a feasible solution of this embodiment, the thickness T of the elastic pad can be set to a reasonable value such as 1 mm, 2 mm, 3 mm, or 4 mm.

Referring to FIG. 7, in this embodiment, at least one notch 213 is provided in the circumferential direction of the slot 211. Specifically, the notch 213 is provided on front and rear sides of the slot 211, respectively. This can reasonably reduce thickness K of the striking block 210 in the anteroposterior direction, reduce the weight of the striking block 210 to a reasonable extent, and further increase moving speed of the striking unit 200 in the nailing direction (M1) when being driven by the compressed striking spring 120, thereby enhancing the striking effect.

Figure 10:
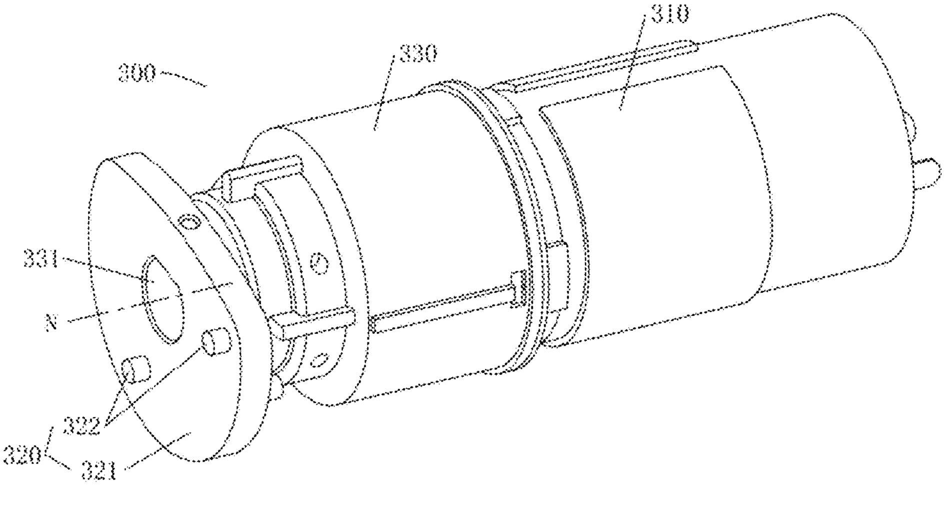
FIG. 10 is a structural view of a drive unit in the spring-loaded nail gun according to the first implementation.

Referring to FIG. 10, in this embodiment, the drive unit 300 further comprises a speed reduction structure 330. The electric motor 310 actuates, via the speed reduction structure 330, the lifting member 320 to rotate. The speed reduction structure 330 may adopt a planetary gear reducer structure. Specifically, the lifting member 320 comprises a lifting wheel 321 and a drive pin 322 provided on the lifting wheel 321, the lifting wheel 321 being sleeved on an output shaft 331 of the speed reduction structure 330, an axial direction of the output shaft 331 being set perpendicular to that of the guide rod 110. Two drive pins 322 are provided, which are distributed in a staggered manner along the circumferential direction of the lifting wheel 321. Meanwhile, the two drive pins 322 differ in terms of distances from central axis N of the output shaft 331, where one drive pin 322 is arranged proximal to the output shaft 331 while the other is arranged distal to the output shaft 331.

Referring to FIG. 9, the striking block 210 is provided thereon with a transmission surface 214 adapted to fit with the drive pin 322. The rotating lifting wheel 321 drives, via abutment between the drive pin 322 and the transmission surface 214, the striking unit 200 to move along the preset energy-storing direction (M2). Moreover, the minimum distance L between the transmission surface 214 and the central axis J of the guide rod 110 is greater than a radius of the striking spring 120; this prevents the drive pin 322 moving with the lifting wheel 321 from colliding with the striking spring 120, thereby ensuring structural stability of the striking spring 120. Specifically, the shaft bore 212 is disposed to the left of a central portion of the striking block 210, a thickened portion 216 protruding toward the lifting wheel 321 is provided on a right side of the striking block 210, and a clearance recess 215 is formed on a side of the thickened portion 216 facing the lifting wheel 321. The transmission surface 214 is formed on a top wall of the clearance recess 215 and an underside of the thickened portion 216, respectively. The central axis J of the guide rod 110 is substantially coincident with that of the shaft bore 212. The distance between the underside of the clearance recess 215 parallel to the central axis J and the central axis J of the shaft bore 212 is L, $L>0.5*d2$. By arranging the transmission surface 214 on the thickened portion 216, not only the size of the striking block 210 is controlled, but also an enough distance is set between the transmission surface 214 and the striking spring 120; as such, when the drive pin 322 on the lifting wheel 321 rotates with the lifting wheel 321, it can be prevented from colliding with the striking spring 120. As a feasible solution of this embodiment, $L-d2/2$ can be set to a reasonable value such as 1 mm, 1.2 mm, 1.5 mm, 1.7 mm, or 2 mm.

When the electric motor 310 actuates, via the speed reduction structure 330, the lifting member 320 to rotate, the two drive pins 322 on the lifting wheel 321 sequentially abut against the corresponding transmission surfaces 214, respectively. With the abutment-fit between the drive pins 322 and the transmission surfaces 214, the striking unit 200 is driven to overcome the bias imposed by the striking spring 120 and move upward along the energy-storing direction (M2). During this process, the striking spring 120 is compressed to store energy. When nailing, the drive pin 322 disengages from the corresponding transmission surface 214 to relax the striking spring 120, so that the striking spring 120 recovering from deformation drives the striking unit 200 to move rapidly downward along the nailing direction (M1), while the downward-moving striker 220 drives a fed nail into the workpiece.

In this embodiment, a trigger 610 configured to initiate a nailing process is provided on an underside of a front end of the handle portion 420, and a start/stop switch 620 corresponding to the trigger 610 is provided in the front end of the handle portion 420. The start/stop switch 620 is normally off. The trigger 610 is provided thereon with a swingable swing lever 630 and a torsion spring acting on the swing lever 630. The lifting wheel 321 is provided thereon with a pin 323 that interacts with the swing lever 630 such that the swing lever 630 holds the start/stop switch 620 on during the nailing process. Due to the interaction between the pin 323 and the swing lever 630, the operator is not required to hold the trigger 610 throughout the nailing process.

The spring-loaded nail gun 10 of this embodiment further comprises a guide unit 710 and a nail feeding unit 720, where the guide unit 710 is disposed at a bottom of the body portion 410 and the nail feeding unit 720 is detachably mounted on the housing 400. To mount the nail feeding unit 720 onto the housing 400, a front end of the nail feeding unit 720 is connected to the guide unit 710, and a rear end thereof is connected to the receiving portion 430 of the housing 400.

Figure 11:
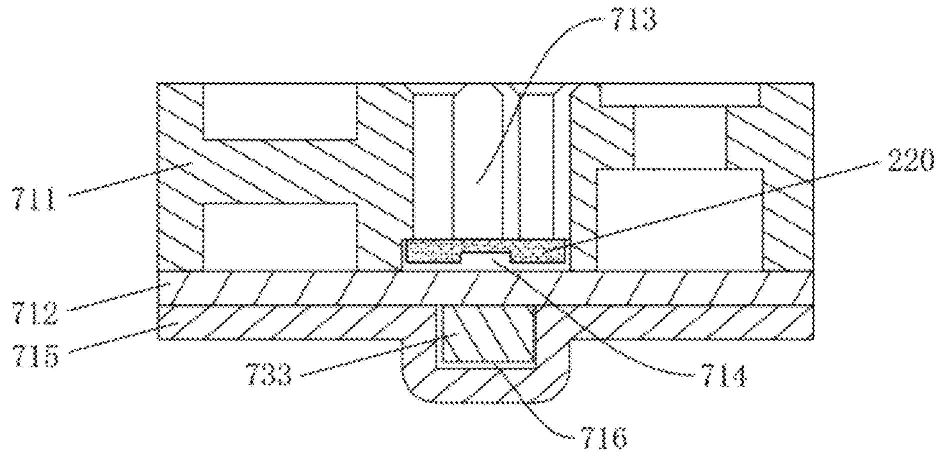
FIG. 11 is a sectional view of a guide rod in an anteroposterior direction in the spring-loaded nail gun according to the first implementation.

Referring to FIGS. 3 and 11, in this embodiment, the guide unit 710 comprises a stationary guide seat 711 and a guide cover 712 fixedly attached to a front side of the guide seat 711, the guide seat 711 being provided thereon with a guide port 713 communicating with a nail feeding passage of the nail feeding unit 720, a strike passage 714 communicating with the guide port 713 being formed between the guide seat 711 and the guide cover 712, the strike passage 714 extending vertically and defining the nailing direction (M1) and the energy-storing direction (M2), the striker 220 partially projecting into the strike passage 714. The nail feeding unit 720 feeds, via the guide port 713, a fastener into the strike passage 714, the striking unit 200 being driven by the striking spring 120 to move downward to strike the fastener out of the strike passage 714 into the workpiece. A specific structure of the nail feeding unit 720 can refer to an existing technology, which will not be detailed here.

To enhance nailing safety, the spring-loaded nail gun 10 of this embodiment is further provided with a safety trigger unit 730. Specifically, the safety trigger unit 730 comprises a safety switch 731, an ejecting rod 732, a safety spring (not shown), and an ejecting pin 733. The safety switch 731 is fixed inside the body portion 410 of the housing 400 and is normally off. The ejecting rod 732 is up-down movably arranged in the body portion 410 and disposed under the safety switch 731. An upper end of the safety spring is positionally fixed, and a lower end thereof abuts against the ejecting rod 732. The safety spring biases the ejecting rod 732 downward, so that the ejecting rod 732 in a normal state releases the safety switch 731. A front cover 715 is provided at a front side of the guide cover 712, and a limiting passage 716 extending vertically is formed between the front cover 715 and the guide cover 712. A segment of the ejecting pin 733 is located in the limiting passage 716 and is up-down movable. An upper end of the ejecting pin 733 projects upward out of the limiting passage 716 and can abut against the ejecting rod 732, while a lower end of the ejecting pin 733 extends downward out of the limiting passage 716 and can abut against the workpiece, thereby limiting the up-down movement travel of the ejecting pin 733. Furthermore, a locating element 734 is fixedly attached to the lower end of the ejecting pin 733. When nailing, the locating element 734 is pressed against the workpiece, which drives the ejecting pin 733 to move upward; the ejecting pin 733 moving upward drives the ejecting rod 732 to move upward against the bias of the safety spring, the upward-moving ejecting rod 732 acting on the safety switch 731 so that the safety switch 731 switches from off to on. Only when the safety switch 731 and the start/stop switch 620 are both on can the spring-loaded nail gun 10 be successfully activated to perform nailing. This embodiment does not limit the on sequence of the safety switch 731 and the start/stop switch 620. When the locating element 734 migrates from the workpiece, the safety spring recovering from deformation drives the ejecting rod 732 and the ejecting pin 733 to move downward, and the downward-moving ejecting rod 732 releases the safety switch 731, so that the safety switch 731 switches from on to off.

Figure 12:
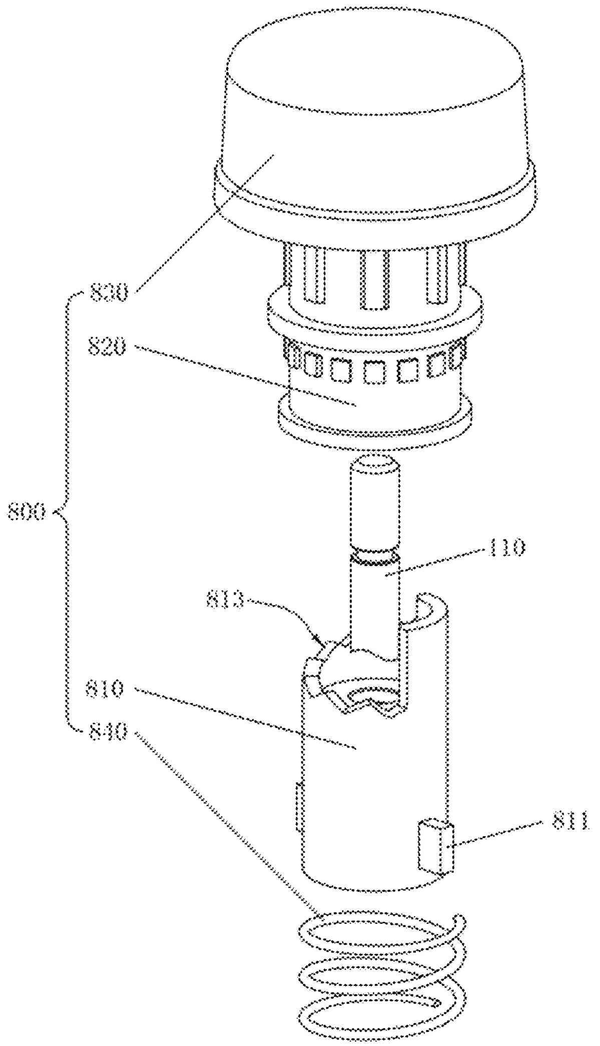
FIG. 12 is an exploded view of an adjusting unit in the spring-loaded nail gun according to the first implementation.
Figure 13:
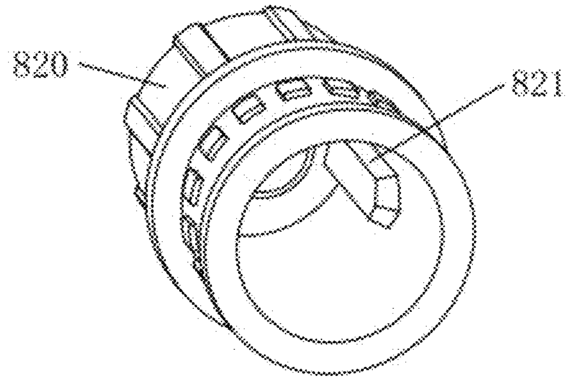
FIG. 13 is a structural view of an outer sleeve body in the spring-loaded nail gun according to the first implementation.

Referring to FIG. 12, to adjust a nailing depth, the spring-loaded nail gun 10 of this embodiment is further provided with an adjusting unit 800 configured to adjust an axial height of the guide rod 110. Specifically, the adjusting unit 800 comprises an inner sleeve body 810, an outer sleeve body 820, a screw cap 830, and an adjusting spring 840. The inner sleeve body 810 is fixedly attached to an upper end of the guide rod 110, and the upper end of the striking spring 120 projects into the inner sleeve body 810 to abut against a locating plate 812 inside the inner sleeve body 810. The adjusting spring 840 is located on an outer periphery of the inner sleeve body 810 and is disposed in a compressed state. An upper end of the adjusting spring 840 abuts against a protrusion 811 on an outer circumferential wall of the inner sleeve body 810, while a lower end thereof abuts against an inner wall of the body portion 410 so as to be fixedly positioned. The adjusting spring 840 biases the inner sleeve body 810 upward. The outer sleeve body 820 is sleeved over the inner sleeve body 810 and axially positioned inside the upper end of the body portion 410, and the screw cap 830 is sleeved on an upper end of the outer sleeve body 820 and is located on top of the body portion 410. A top surface of the inner sleeve body 810 is provided with a series of ratchet surfaces 813 of various heights. Referring to FIG. 13, a convex rib 821 that can abut against one of the ratchet surfaces 813 is provided on an inner wall of the outer sleeve body 820. When the outer sleeve body 820 is twisted via the screw cap 830, the convex rib 821 on the outer sleeve body 820 abuts against the ratchet surface 813 so that the inner sleeve body 810 can move downward against the bias of the adjusting spring 840. When the twisting stops, the adjusting spring 840 recovering from deformation biases the inner sleeve body 810 upward so that one of the ratchet surfaces 813 abuts against the convex rib 821. Due to the abutment between the ratchet surface 813 and the convex rib 821, the inner sleeve body 810 and the guide rod 110 can be axially positioned to a certain height. The adjusting unit 800 is operable to adjust a specific height position of the upper end of the striking spring 120. Since the distance that the striking unit 200 moves upward along the energy-storing direction (M2) under the drive of the lifting wheel 321 is certain, the axial length of the striking spring 120 compressed for energy storage can be adjusted via the adjusting unit 800. The striking spring 120 compressed to different axial lengths exerts different forces on the striking unit 200, so that the downward movement speed of the striking unit 200 along the nailing direction (M1) is determined by the force exerted by the striking spring 120.

To perform a striking action, the drive pin 322 is disengaged from the transmission surface 214, and the compressed striking spring 120 drives the striking unit 200 to move downward along the nailing direction (M1). The downward-moving striking unit 200 drives a fastener in the strike passage 714 into the workpiece.

Upon end of the striking action, the drive unit 300 drives, via abutment-fit between the drive pin 322 and the transmission surface 214, the striking unit 200 to move upward along the energy-storing direction (M2). The upward-moving striking unit 200 compresses the striking spring 120 to accomplish energy storage.

It can be understood that when the spring-loaded nail gun 10 is activated, the striking unit 200 can stop at a higher compressed position of the striking spring 120 or at a lower relaxed position of the striking spring 120.

It can be understood that the fastener driven into the workpiece by the striking unit 200 can be a straight nail, a U-shaped nail, or the like.

It can be understood that two guide rods 110 can also be provided, spaced apart in a left-right direction. Correspondingly, two striking springs 120 are also provided, spaced apart in the left-right direction, the two striking springs 120 being sleeved on the two guide rods 110, respectively, with a gap therebetween. In this case, one striking block 210 is provided and sleeved on both of the two guide rods 110. Two slots 211 are formed on the striking block 210, and one sleeve 230 is sleeved on the two guide rods 110, respectively. The elastic pad 240 is provided on respective base portions 232 of the sleeves 230. The lower ends of the two striking springs 120 abut against the two elastic pads 240, respectively, thereby pressing the two sleeves into the two slots 211, respectively.

Embodiment 2

Figure 14:
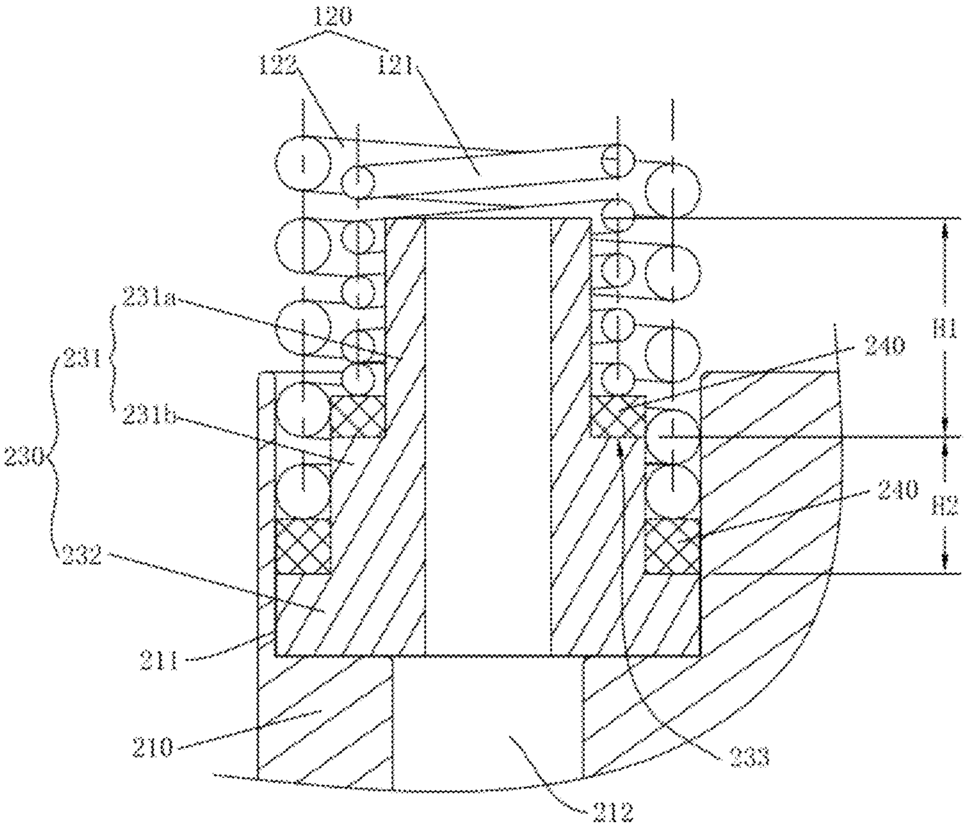
FIG. 14 is a fitting structure view between a striking spring and a striking block in a spring-loaded nail gun according to a second implementation.

Referring to FIG. 14, in this embodiment, the striking spring 120 is provided with a small-diameter spring 121 and a large-diameter spring 122, the small-diameter spring 121 and the large-diameter spring 122 being nested one inside the other with a gap therebetween. The limiting portion 231 includes a first limiting portion 231*a* corresponding to the small-diameter spring 121 and a second limiting portion 231*b* corresponding to the large-diameter spring 122. The first limiting portion 231*a* is thinner than the second limiting portion 231*b* so that a stepped surface 233 is formed therebetween. A lower end portion of the small-diameter spring 121 is sleeved on an outer periphery of the first limiting portion 231*a* and abuts against the stepped surface 233, while a lower end portion of the large-diameter spring 122 is sleeved on an outer periphery of the second limiting portion 231*b* and abuts against the base portion 232. Exemplarily, the elastic pad 240 is provided on the stepped surface 233 and the base portion 232, respectively, the lower end portion of the small-diameter spring 121 abutting against the elastic pad 240 on the stepped surface 233, the lower end portion of the large-diameter spring 122 abutting against the elastic pad 240 on the base portion 232. Axial height H1 of the first limiting portion 231*a* can be set to a reasonable value such as 7 mm, 8 mm, 9 mm, 10 mm, 11 mm, 12 mm, 13 mm, 14 mm, or 15 mm. Axial height H2 of the second limiting portion 231*b* can be set to a reasonable value such as 7 mm, 8 mm, 9 mm, 10 mm, 11 mm, 12 mm, 13 mm, 14 mm, or 15 mm, the axial height H2 of the second limiting portion 231*b* being exemplarily set to be smaller than the axial height H1 of the first limiting portion 231*a*. In addition, the thickness of the elastic pad 240 can be set to a reasonable value such as 1 mm, 2 mm, 3 mm, or 4 mm.

In this embodiment, an inner diameter of the large-diameter spring 122 is greater than an outer diameter of the small-diameter spring 121, which prevents mutual contact between the large-diameter spring 122 and the small-diameter spring 121. In addition, the inner diameter of the small-diameter spring 121 is slightly greater than an outer diameter of the first limiting portion 231*a*; the inner diameter of the large-diameter spring 122 is slightly greater than an outer diameter of the second limiting portion 231*b* but less than or equal to an outer diameter of the base portion 232, the lower end portion of the large-diameter spring 122 projecting into the slot 211. The top surface of the striking block 210 can be set flush with the top surface of the sleeve 230 or can be located higher than the top surface of the sleeve 230 but lower than a top surface of the upper elastic pad 240, while the lower end portion of the large-diameter spring 122 is located between the outer peripheral surface of the second limiting portion 231*b* and the inner peripheral surface of the slot 211.

In this embodiment, helical directions of the small-diameter spring 121 and the large-diameter spring 122 are exemplarily set in opposite directions.

The remaining structures of the second embodiment are identical to those of the first embodiment, which will not be detailed here.

In addition to the exemplary embodiments described supra, the present disclosure further has other implementations. Those skilled in the art can make various changes and modifications according to the present disclosure, and all such changes and modifications shall fall within the scope limited in the appended claims without departing from the spirits of the present disclosure.

I claim:

1. A spring-loaded nail gun, comprising:

a guide rod;

a striking spring sleeved over the guide rod with a gap therebetween;

a striking unit comprising a striking block slidably sleeved on the guide rod and a striker attached to the striking block, the striking spring, when being compressed, driving the striking unit to move along a preset nailing direction to drive a fastener into a workpiece; and a drive unit comprising an electric motor and a lifting member actuated by the electric motor, the lifting member being actuated by the electric motor to drive the striking unit to move along a preset energy-storing direction such that the striking spring is compressed, the energy-storing direction being opposite the nailing direction;

wherein a sleeve is further sleeved on the guide rod, and a slot adapted to fit with the sleeve is formed on the striking block, the sleeve has a limiting portion and a base portion which are axially distributed, an outer diameter D1 of the limiting portion being smaller than an outer diameter D2 of the base portion, an end portion of the striking spring being sleeved on an outer periphery of the limiting portion and abutting against the base portion, the sleeve being pressed by the striking spring into the slot, the end portion of the striking spring being also disposed in the slot.

2. The spring-loaded nail gun according to claim 1, wherein the limiting portion has an axial height H ranging from 7 mm to 15 mm.

3. The spring-loaded nail gun according to claim 1, wherein the slot has an inner diameter D3, and the striking spring has an inner diameter d1 and an outer diameter d2, where D1□d1□d2≤D2≤D3.

4. The spring-loaded nail gun according to claim 1, wherein an elastic pad is provided on the base portion, the end portion of the striking spring abutting against the elastic pad.

5. The spring-loaded nail gun according to claim 4, wherein the elastic pad has a thickness T ranging from 1 mm to 4 mm.

6. The spring-loaded nail gun according to claim 1, wherein the striking spring is configured to include a small-diameter spring and a large-diameter spring which are nested one inside the other with a gap therebetween; the limiting portion includes a first limiting portion corresponding to the small-diameter spring and a second limiting portion corresponding to the large-diameter spring; the first limiting portion is thinner than the second limiting portion so that a stepped surface is formed therebetween; an end portion of the small-diameter spring is sleeved on an outer periphery of the first limiting portion and abuts against the stepped surface, and an end portion of the large-diameter spring is sleeved on an outer periphery of the second limiting portion and abuts against the base portion.

7. The spring-loaded nail gun according to claim 6, wherein the elastic pad is provided on the stepped surface and the base portion, respectively.

8. The spring-loaded nail gun according to claim 7, wherein the elastic pad has a thickness T ranging from 1 mm to 4 mm.

9. The spring-loaded nail gun according to claim 1, wherein at least one notch is provided in a circumferential direction of the slot.

10. The spring-loaded nail gun according to claim 1, wherein the lifting member comprises a lifting wheel and a drive pin arranged on the lifting wheel; a transmission surface adapted to fit with the drive pin is provided on the striking block; the lifting wheel, when rotating, drives, via abutment between the drive pin and the transmission surface, the striking unit to move along the preset energy-storing direction; and a minimum distance L between the transmission surface and a central axis of the guide rod is greater than a radius of the striking spring.

11. The spring-loaded nail gun according to claim 10, wherein the striking block is provided with a thickened portion protruding toward the lifting wheel, and the transmission surface is arranged on the thickened portion.

* * * * *